US009835017B2

(12) United States Patent
Taylor (10) Patent No.: US 9,835,017 B2
(45) Date of Patent: Dec. 5, 2017

(54) SEISMIC MONITORING SYSTEM AND METHOD (71) Applicant: Schlumberger Technology Corporation, Sugar Land, TX (US)

(72) Inventor: Stewart Thomas Taylor, Farmers Branch, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1242 days.

(21) Appl. No.: 13/625,550

(22) Filed: Sep. 24, 2012

(65) Prior Publication Data

US 2014/0083681 A1    Mar. 27, 2014

(51) Int. Cl.
E21B 43/26 (2006.01)
G01V 1/42 (2006.01)

(52) U.S. Cl.
CPC ............. *E21B 43/26* (2013.01); *G01V 1/42* (2013.01)

(58) Field of Classification Search
CPC ...... G01V 1/30; G01V 1/306; G01V 2210/43; G01V 2210/61; G01V 2210/614; G01V 2210/624
See application file for complete search history.

(56) References Cited

U.S. PATENT DOCUMENTS

| 3,739,871 A * | 6/1973 | Bailey ............................. 367/37 |
| 4,922,362 A | 5/1990 | Miller et al. |
| 5,440,525 A * | 8/1995 | Dey-Sarkar et al. ........... 367/52 |
| 5,796,678 A * | 8/1998 | Pisetski ........................... 367/38 |
| 5,838,634 A * | 11/1998 | Jones et al. ..................... 367/73 |
| 6,138,075 A * | 10/2000 | Yost ................................ 702/14 |
| 6,302,221 B1 * | 10/2001 | Hamman et al. ............... 175/50 |
| 6,462,549 B1 | 10/2002 | Curtis et al. |
| 6,662,146 B1 * | 12/2003 | Watts .............................. 703/10 |
| 6,718,265 B2 * | 4/2004 | Herron et al. .................... 702/8 |
| 6,748,330 B2 | 6/2004 | Leaney |
| 6,754,587 B1 * | 6/2004 | Trappe et al. .................. 702/10 |
| 6,853,922 B2 * | 2/2005 | Stark .............................. 702/14 |
| 6,941,227 B2 * | 9/2005 | Goloshubin et al. ........... 702/17 |
| 6,980,940 B1 * | 12/2005 | Gurpinar et al. ............... 703/10 |
| 7,051,808 B1 * | 5/2006 | Vinegar et al. ............ 166/250.1 |
| 7,328,107 B2 * | 2/2008 | Strack et al. ................... 702/14 |
| 7,391,675 B2 | 6/2008 | Drew |

(Continued)

OTHER PUBLICATIONS

Crampin, et al., "Estimating crack parameters from observations of P-wave velocity anisotropy", Geophysics, vol. 45 (3), 1980, pp. 345-360.

(Continued)

*Primary Examiner* — Blake E Michener (57) ABSTRACT

In one embodiment, the invention utilizes computer models to calculate predicted spectral estimates that may be encountered during a hydraulic fracturing operation. Seismic events generated by hydraulic fracturing are mapped and displayed upon a graphic user interface. Spectral attributes of selected seismic wave field data from the fracture operation are derived and compared to predicted spectral estimates that match one or more characteristics of the formation. The comparison may be utilized to generate a predicted hydrocarbon content for the fracture zone of the formation and to adjust or alter the hydraulic fracturing operation in order to maximize hydrocarbon recovery.

20 Claims, 4 Drawing Sheets

(56) References Cited

U.S. PATENT DOCUMENTS

| | | | |
|---|---|---|---|
| 7,457,195 B2 | 11/2008 | Jones | |
| 7,480,206 B2 * | 1/2009 | Hill | 367/73 |
| 7,499,374 B2 * | 3/2009 | Ferber | 367/58 |
| 7,702,463 B2 * | 4/2010 | Levin | 702/14 |
| 7,783,462 B2 * | 8/2010 | Landis et al. | 703/10 |
| 7,986,319 B2 * | 7/2011 | Dommisse et al. | 345/419 |
| 8,041,510 B2 * | 10/2011 | Dasgupta | 702/12 |
| 8,355,872 B2 * | 1/2013 | Rowan | 702/6 |
| 8,861,309 B2 * | 10/2014 | Vu et al. | 367/73 |
| 2002/0185329 A1 * | 12/2002 | Goloshubin et al. | 181/111 |
| 2003/0155111 A1 * | 8/2003 | Vinegar et al. | 166/59 |
| 2004/0008580 A1 * | 1/2004 | Fisher et al. | 367/56 |
| 2004/0034474 A1 * | 2/2004 | Herron et al. | 702/6 |
| 2004/0210547 A1 * | 10/2004 | Wentland et al. | 706/46 |
| 2005/0060099 A1 * | 3/2005 | Sorrells et al. | 702/14 |
| 2006/0023567 A1 * | 2/2006 | Uhl et al. | 367/13 |
| 2007/0021951 A1 * | 1/2007 | Lee Seislink | 703/10 |
| 2007/0203673 A1 * | 8/2007 | Sherrill et al. | 702/189 |
| 2008/0040086 A1 * | 2/2008 | Betancourt et al. | 703/10 |
| 2008/0259727 A1 | 10/2008 | Drew | |
| 2009/0010104 A1 | 1/2009 | Leaney | |
| 2009/0168599 A1 * | 7/2009 | Suarez et al. | 367/35 |
| 2010/0262372 A1 * | 10/2010 | Le Calvez et al. | 702/14 |
| 2011/0108283 A1 * | 5/2011 | Srnka et al. | 166/369 |
| 2011/0174490 A1 * | 7/2011 | Taylor et al. | 166/308.1 |
| 2012/0092959 A1 * | 4/2012 | Taylor et al. | 367/32 |

OTHER PUBLICATIONS

Haldorsen, et al., "Multichannel wiener deconvolution of vertical seismic profiles", Geophysics, vol. 59(10), 1994, pp. 1500-1511.

Hardage, B.A., "Chapter 7—Section 7.7: Seismic Wave Attenuation" and "Chapter 8—Section 8.6: Detection of Manmade Fractures", Vertical Seismic Profiling: Principles, Third Updated and Revised Edition, Pergamon: New York, 2000, p. 396 and p. 462.

* cited by examiner

SEISMIC MONITORING SYSTEM AND METHOD

BACKGROUND

In order to improve the recovery of hydrocarbons from hydrocarbon wells, subterranean formations surrounding such wells may be hydraulically fractured. Hydraulic fracturing is used to create small cracks in subsurface formations to release trapped hydrocarbons from pore spaces such that they may more toward the well for extraction.

Hydraulic fracturing involves injecting fracturing fluid(s) into the wellbore directed at the face of a geologic formation at pressures sufficient to initiate and extend cracks (fractures) in the formation. Continued pumping, of the fracturing fluid(s) may be utilized to extend the fractures. A proppant, such as sand or other particulate material, may be suspended in the fracturing fluid(s) and introduced into the created fractures.

The proppant material, holds or "props" open the fracture and prevents the formed fractures from closing upon reduction of the hydraulic pressure. In this manner, conductive channels remain through which produced fluids can readily flow to the wellbore upon completion of the fracturing operation. The proppant creates a plane of high-permeability material such as sand or other particulates through which production fluids can flow to the wellbore. High viscosity fracturing fluids may be utilized in order to carry effective volumes of proppant material into the formation.

Hydraulic fracturing operations represent a significant investment of time and resources for an oil and gas project. This is due, at least in part, to the painstaking preparation required for each phase of the fracturing operation. Further, studies suggest that only one in five fracturing operations result in significant oil or gas production. As such, there remains a need for a system and method capable of enhancing the analysis of data obtained during the hydraulic fracturing process and improving, the efficiency of hydraulic fracturing operations.

SUMMARY

Accordingly, the present disclosure describes a system, method and computer readable medium capable of improving the efficiency of hydraulic fracturing operations. In one embodiment, poroelastic computer models may be utilized to calculate predicted spectral estimates that may be encountered during a hydraulic fracturing operation. In one embodiment, various combinations of formation parameters such as the number of subterranean fractures, the thickness of the subterranean fractures, subterranean fracture orientation, hydraulic fracturing fluid characteristics such as fracturing fluid content/composition/volume, proppant characteristics, and hydrocarbon content within at least a portion of the fractures may be taken into account during, the calculation of predicted spectral attributes.

In one embodiment, the predicted spectral properties may be assembled and stored upon one or more searchable computer databases. Predicted spectral attributes may be made available during subsequent hydraulic fracturing operations in order to enhance the efficiency of the fracture operation.

Seismic events generated by hydraulic fracturing create seismic waves that may be received by sensors and recorded by a computer control system. The seismic waves received by sensors may be used to monitor and map the seismic events caused by the fracture operation.

In one embodiment, the mapping/imaging results may be displayed to a user upon a graphic user interface. In one embodiment, the displayed results illustrate graphic representations of each detected seismic event showing their relative positioning within the formation. In one embodiment, the positioning of each detected seismic event is utilized to determine which seismic wave fields travel through fractures induced by the hydraulic fracturing operation.

In one embodiment, data pertaining to a subset of the seismic events recorded by the system may be selected for further analysis. The subset of data selected fir further analysis may include data pertaining to seismic events having wave field(s) determined to pass through fractures induced by a hydraulic fracturing operations. In one embodiment, seismic events of interest may be seismic events located on the far side of the fracture treatment zone, i.e., farthest from the seismic sensor array. The direct wave fields for selected seismic events may then be subjected to digital signal processing methods and analyzed in order to derive their spectral attributes.

After the spectral attributes of selected seismic wave field data from the fracture operation have been derived, the database of predicted spectral estimates may be searched for predicted spectral data having one or more formation parameters in common with the current operation.

In one embodiment, the user may enter searchable formation characteristics such as the number of subterranean fractures, the thickness of the subterranean fractures, subterranean fracture orientation, hydraulic fracturing fluid characteristics such as fracturing fluid content/composition/volume, proppant characteristics, average fracture thickness, etc. Predicted spectral estimates matching one or more of the searched formation parameters may be retrieved from the database and compared to the determined spectral estimates.

The comparison may be utilized to generate a predicted hydrocarbon content for the stimulated zone of the formation being subjected to hydraulic fracturing. In one embodiment, the predicted attenuation of the power spectrum may be compared to the determined attenuation of the power spectrum for selected seismic events and matched to a predicted hydrocarbon content value associated with one or more attenuation values.

Results of the comparison(s) may be displayed upon a graphic user interface in real time or according to a predetermined schedule. Information concerning the estimated hydrocarbon content released by the fracturing operation may be utilized to adjust or alter the fracturing operation, thus improving operational efficiency.

This summary is provided to introduce a selection of concepts in a simplified form that are further described herein. This summary is not intended to identify key or essential features of the claimed subject flatter, nor is it intended to be used as an aid in determining the scope of the claimed subject matter.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings; it being, understood that the drawings contained herein are not necessarily drawn to scale and that the accompanying drawings provide illustrative implementations and are not meant to limit, the scope of various technologies described herein; wherein.

DETAILED DESCRIPTION

In the following description, numerous details are set forth to provide an understanding of various embodiments of the invention. However, it will be understood by those skilled in the art that the invention may be practiced without these details and that numerous variations or modifications from the described embodiments may be possible.

The present disclosure describes embodiments of a seismic monitoring method, a computer readable medium for seismic monitoring and a seismic monitoring system. Seismic monitoring may include velocity modeling, survey design, seismic sensor receiver, sensor, geophone, accelerometer, antennae, etc.) orientation, model calibration, and an acquisition phase, processing phase, interpretation phase and adaptation phase. Examples of methods and systems for microseismic monitoring are disclosed in U.S. Pat. Nos. 7,457,195; 7,391,675; 6,748,330; 6,462,549; U.S. Patent Application Nos. 2008/0259727 and 2009/0010104, all of which are incorporated herein by reference.

Figure 1:
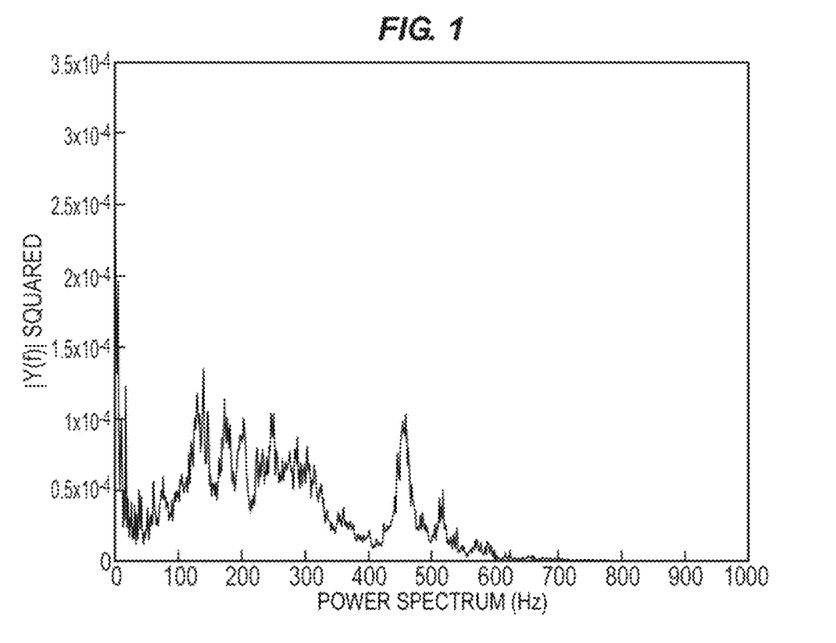
FIG. 1 is a graphical representation of the power spectrum of selected seismic events positioned on the near side of a fracture zone in one embodiment.
Figure 2:
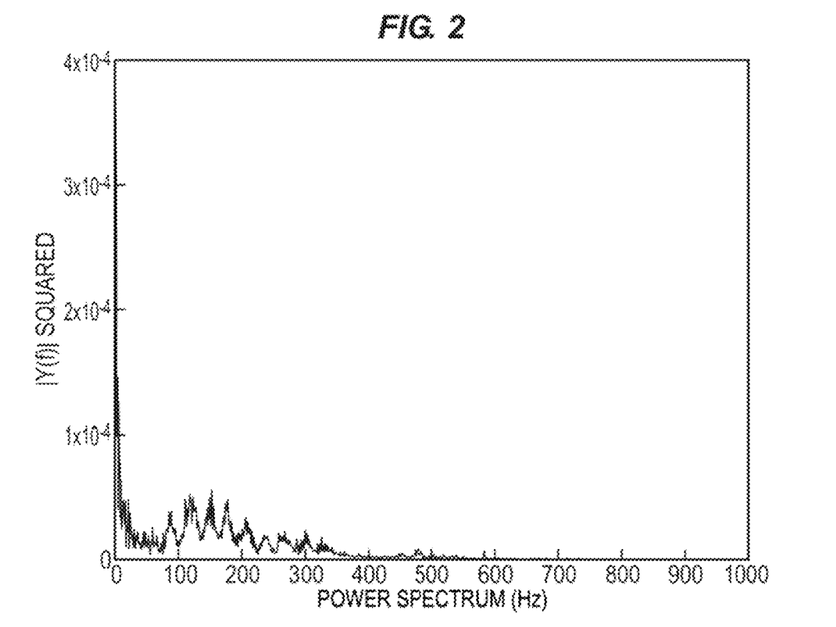
FIG. 2 is a graphical representation of the power spectrum of selected seismic events positioned on the far side of a fracture zone in one embodiment.

One of the principles that may be employed by the system, method and computer readable medium described herein relates to the behavior of seismic wave fields that pass through areas of the subterranean formation that have been subjected to hydraulic fracturing. Specifically, it has been determined that fractures containing hydrocarbons will impact the spectral attributes of wavefield(s) passing through them. FIGS. 1 and 2 illustrate power spectrum information pertaining to seismic data that has been subjected to spectral analysis after a hydraulic fracturing operation using an arrangement that may or may not be similar to the example configuration shown in FIG. 5, described below.

FIG. 1 illustrates power spectrum information for an example group of seismic events located on a near side of a fracture treatment zone, i.e., in an area of the fracture zone that is relatively close to the seismic sensor array and/or where the seismic wavefield(s) are less likely to pass through already fractured portions of the formation. FIG. 2 also illustrates example seismic event data obtained during a hydraulic fracturing operation that has been subjected to spectral analysis. However, the group of example seismic events illustrated in FIG. 2 are positioned on a far side of the fracture treatment zone, i.e., in an area of the fracture zone that is relatively far from the seismic sensor array and/or where the seismic wavefield(s) are more likely to pass through already fractured portions of the formation.

The power spectrum for selected seismic events may be derived front Fast Fourier Transform (FFT) analysis of the seismic waveforms generated by the selected events. It can be seen that the spectra of the example events on the far side of the treatment zone (shown in FIG. 2) show reduced (or attenuated) spectral power values compared to those on the near side of the treatment zone shown in FIG. 1. Further, in this example, the spectral power of frequencies greater than about 325 Hz are noticeably diminished for seismic events located in the far side of the fracture zone as compared to those in the near side of the fracture zone.

One difference from the seismic events of the example of FIG. 2, compared to those of FIG. 1, is that the seismic wave fields generated by far side events of FIG. 2 travel through areas of the formation that have already been subjected to hydraulic fracturing. This leads one to the conclusion that wave fields passing through already fractured areas of the formation will exhibit reduced or attenuated spectral power values. In this example, spectral power frequencies greater than or equal to about 325 Hertz may be subject to noticeable attenuation. However, it should be noted that the actual amount of spectral power attenuation observed during a fracturing operation will depend on a number of factors. In one embodiment, attenuation of the power spectrum may be observed at frequency values of greater than or equal to about 50 Hertz, depending on the characteristics of the formation and the amount of hydrocarbons released during the fracturing operation.

Figure 3:
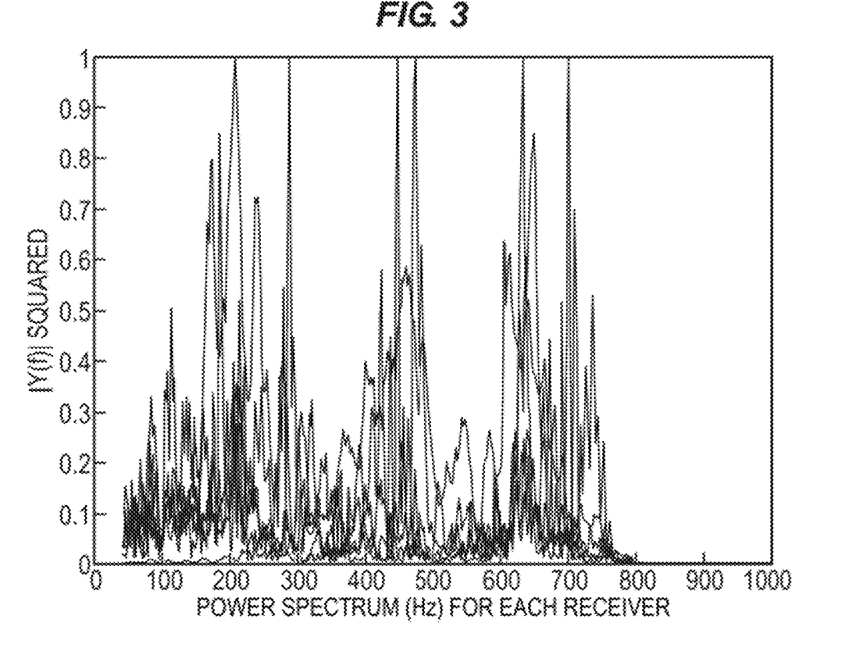
FIG. 3 is a graphical representation of the power spectrum of a selected seismic event in one embodiment.

Further, it may be shown that the reduced power spectra for seismic events located on the far side of the fracture zone is not due solely to the additional distance traveled by the wavefield, i.e., the distance from the seismic event to the receiver array. FIG. 3 illustrates example spectral data generated by a seismic event located about 700 feet away from a sensor array in a formation that has not been subjected to hydraulic fracturing and that is composed primarily of consolidated rock. FIG. 3 provides an illustration of the power spectra for a seismic event as received by multiple sensors of a receiver array spanning a substantially vertical distance of 700 feet.

FIG. 3 shows the total power spectra for the illustrated seismic event on different levels of the substantially vertical sensor array. The plot shows that the power spectra of the seismic event is substantially consistent for each sensor of the receiver array in that all sensors show a total power spectrum bandwidth in the range of about 50 to about 750 Hertz. FIG. 3 illustrates that the seismic wave field travel distance of about 700 feet or more inside consolidated rock does not result in a noticeable reduction in the power spectra of the wave field of the measured seismic event.

Based on these results, it may be concluded that the travel distance of about 700 feet does not result in noticeable attenuation of power spectrum frequency content in excess of 200 Hertz. Further, it is notable that spikes in the total power spectrum exist well past frequency values of about 500 Hertz, whereas seismic events with wave field travel paths through fractured media show attenuated frequency content above about 200 Hertz as described above in reference to the example of FIG. 2.

General studies concerning seismic detection of fractured reservoirs such as Wilson, T. H., Shumaker, R. C., and Sims, c., 1987, Seismic Detection of Fractured Devonian Shale Reservoirs, Gas Research Institute Report for contract 5085-213-1146, incorporated herein by reference, demonstrate that low-impedance intervals may be associated with intensely fractured intervals.

These low-impedance intervals may create attenuation of seismic frequencies by reflecting a portion of the direct seismic event wavefield away from the receiver array. For example, Crampin, S, Gonigle, R, and Bamford, D., 1980, Estimating Crack Parameters from Observations of P-Wave Velocity Anisotropy, Geophysics, vol. 45, no. 3, p 345-361, incorporated herein by reference, provides calculations drawn to the proposition that seismic reflection coefficients for fractured shale may differ by 0.1 compared to those for un-fractured shale.

Reflection coefficients of this magnitude may significantly decrease the power spectrum of events traveling through the fractured media. As the number of fractures increase, the amount of frequency attenuation may also increase. In order to utilize this principle in connection with a hydraulic fracture operation, the expected attenuation of the power spectrum frequency may be calculated using various possible formation parameters of the subterranean formation though which the seismic event wave field(s) pass.

Figure 4:
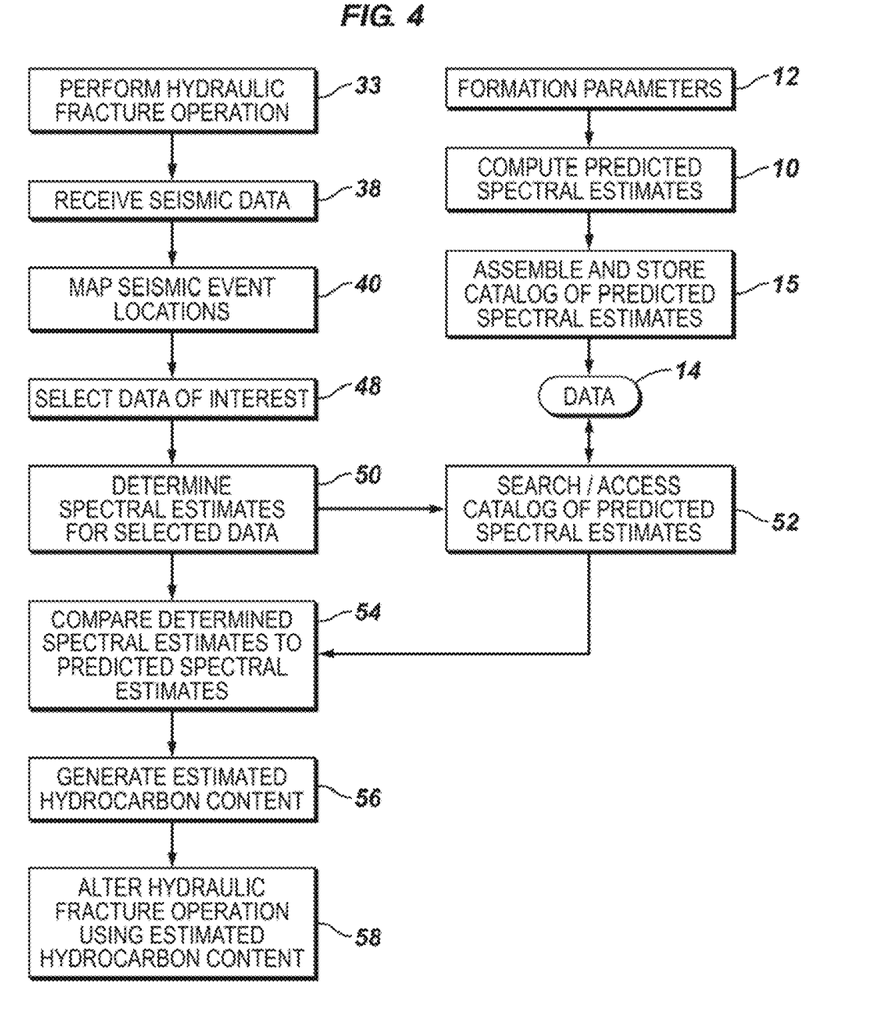
FIG. 4 is a flow chart diagram illustrating a seismic monitoring process of one embodiment.

In one embodiment, poroelastic computer models may be utilized to calculate predicted spectral estimates that may be encountered during a hydraulic fracturing operation, as illustrated by Box (10) of FIG. 4. In one embodiment, the poroelastic computer models may be calculated using one or more computer implemented propagator matrix techniques. Such techniques may be used to calculate parameters such as the normal incidence (NI) reflection coefficient which may, in turn, be utilized to predict spectral estimates for various formation conditions. To illustrate, p-wave velocity (Vp), s-wave velocity (Vs), and density ($\rho$) values obtained from well logs or other data sources may be utilized to calculate the NI reflection coefficients for various areas of the formation. For example, during a recent reservoir stimulation project, a NI reflection coefficient value of 0.0349 (~3%) was calculated for an area of the formation located between normal reservoir rock (where Vp is about 9800, Vs is about 6400, and p is about 2.65) and an area of slightly lower density in the reservoir (where Vp is about 9700, Vs is about 6500, and $\rho$ is about 2.5), in contrast, a NI reflection coefficient value of 0.1299 (~13%) was obtained for an area of the formation located between normal reservoir rock (where Vp is about 9800. Vs is about 6400, and $\rho$ is about 2.65) and an induced fracture in the reservoir rock (where Vp is about 8000. Vs is about 5500, and $\rho$ is about 2.5).

The calculated NI reflection coefficients may be utilized to arrive at predicted spectral estimates for desired area(s) of the formation. In this example, a higher NI reflection coefficient may correspond to more attenuation of the seismic signal passing through the formation due to a greater amount of signal reflection caused by the induced fractures, and vice versa. To illustrate, in this example, if the seismic wave in the reservoir prior to stimulation had a power spectrum amplitude value at a frequency of 500 Hz that was about 50% of the power spectrum amplitude value at a frequency of 100 Hz, then a similar wave traveling through an induced fracture in the reservoir after stimulation would be expected to have a power spectrum amplitude value at a frequency of 500 Hz reduced to less than about 40% of the power spectrum amplitude at a frequency of 100 Hz.

In one embodiment, various combinations of assumed formation parameters such as the number of subterranean fractures, the thickness of the subterranean fractures, subterranean fracture orientation, hydraulic fracturing fluid characteristics such as fracturing fluid content/composition/volume, proppant characteristics, and hydrocarbon content within at least a portion of the fractures may be taken into account during generation of predicted spectral attributes, as illustrated by Box (12). Further, an average fracture thickness may be assumed in lieu of individual thickness values for each fracture.

Predicted spectral estimates may include graphs, curves and/or tables illustrating the predicted spectral properties for various combinations and sub-combinations of assumed formation characteristics. The graphs, curves and/or tables may be displayed upon a graphic user interface as described below. In one embodiment, the predicted spectral properties may be assembled and stored upon one or more searchable computer databases (14) as illustrated by Box (15). Further, the searchable database may be made available to a computer control system and/or the operator of a hydraulic fracturing operation, as described below.

Figure 5:
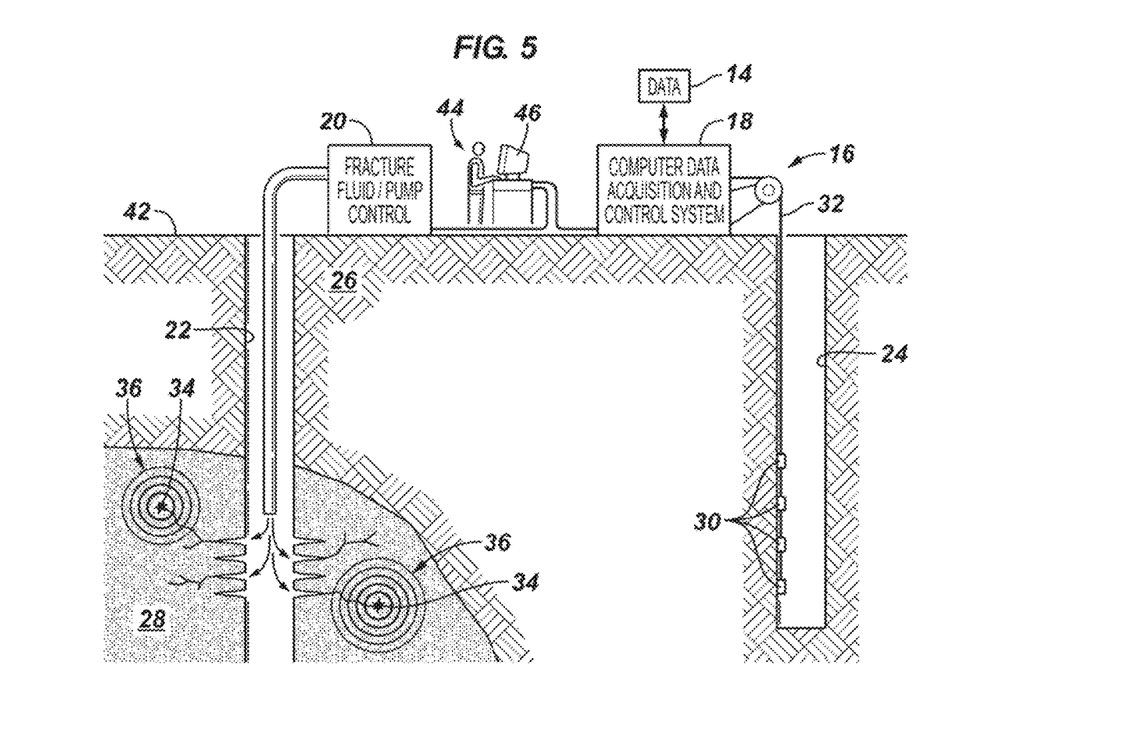
FIG. 5 is a cross sectional illustration of an example seismic monitoring system of one embodiment.

FIG. 5 provides an example seismic monitoring system (16) having a data acquisition and control system (18) and a hydraulic fracturing system (20). In one embodiment, a first wellbore (22) and a second wellbore (24) may be utilized in conjunction with the seismic monitoring system (16). In this embodiment, first wellbore (22) traverses a subterranean formation (26) having one or more zones (28) of the formation that have been selected for a hydraulic fracturing operation. In this example, a single fracture zone is illustrated, for ease of illustration. However, it should be understood that the invention is not limited to a single fracture zone and that any number of fracture zones may be utilized.

A hydraulic fracturing system (30) having one or more fracture fluids, pumps, and/or controls may be coupled to the first wellbore (22). The second wellbore (24) may contain one or more temporary and/or permanent seismic sensors (30). Seismic sensors may include various devices, including without limitation, geophones and accelerometers for receiving waveform data from seismic events including, for example, seismic events caused by hydraulic, fracturing, perforating guns, string shots and the like.

The seismic sensor array may be deployed in any geometry, that is, vertically, horizontally, or any combination of angles relative to the fracture treatment stage. Also the wells may be arranged in any number of orientations and/or any combination of angles relative to the horizontal plane. Surface layers of the earth, e.g., weathering layers, that have been subjected to oxidation and/or water exposure may cause attenuation of seismic signals, in one embodiment, one or more of the seismic sensors may be positioned at least 700 feet beneath the surface (42) of the formation (26) in order to avoid seismic wave field attenuation that may be created by surface layers of the earth.

A communication link (32), such a telemetry wire, may be utilized to facilitate communication between sensors (10) and the computer data acquisition and control system (18). A wireless communication arrangement may also be utilized. Control system (18) may include one or more computer processing units and may be located proximate to wellbore (22), wellbore (24) and/or at a remote location.

Referring to FIGS. 4 and 5, initiation of a hydraulic fracturing operation results in fracture fluid(s) being pumped into wellbore (22) at pressures sufficient to initiate and extend cracks (fractures) in the formation (26), as illustrated by Box (33). Seismic events (34) are created as fractures develop in the zone of stimulation, fracture zone (28), and as the fractures propagate. Seismic events, as referred to herein, may include seismic events having magnitudes greater than M=0 and seismic events having magnitudes of less than M=0, sometimes referred to as micro-seismic events or microseisms. Seismic events (34) in the formation stimulated by the hydraulic fracturing operation create seismic waves (36) that may be received by sensors (30) and recorded by computer control system (18), as illustrated by Box (38).

The seismic waves received by sensors (30) may be used to monitor and map the seismic events (34) caused by the fracture operation, as illustrated by Box (40). In one embodiment, the locations of each seismic event generated during the hydraulic fracturing process may be determined by mapping seismic wave arrival times and polarization information into three-dimensional space through the use of modeled travel times and/or ray paths. Non-linear event location methods may also be used to determine the seismic event locations. Non-linear event location methods may involve the selection and time picking of discreet seismic arrivals for each of multiple seismic sensors as well as mapping to locate the position of seismic events.

Vertical seismic profiling techniques may also be utilized to map the locations of recorded seismic events. Hardage, B. A., 2000, Vertical Seismic Profiling: Principles, Pergamon Press, New York, N.Y., incorporated by reference herein, describes a number of vertical seismic profiling examples. In one embodiment, vertical seismic profiling techniques may be augmented by utilizing direct seismic wave fields produced by the seismic events (instead of reflected wave fields) to map the location of each seismic event caused by the hydraulic fracturing operation. Further, controlled sources and/or induced seismic events located downhole (several hundred feet below the surface (42) of the earth) may be utilized as data sources for characterizing the state of the subterranean formation.

In one embodiment, the mapping/imaging results are displayed to the user (44) upon a graphic user interface (46) coupled to the computer control system (18). In one embodiment, the displayed results illustrate graphic representations of each detected seismic event showing their relative positioning within the formation, as illustrated by FIG. 5. In one embodiment, the positioning of each detected seismic event may be utilized to determine which seismic wave fields travel through fractures induced by the hydraulic fracturing operation.

In one embodiment, the proportion of seismic wave fields that travel through induced fractures may be determined by the geometry of the seismic receiver array and the layout of the wellbores that are utilized to stimulate the formation (26). In one embodiment, seismic events determined to have wave fields passing through fractured areas and/or that are located on the far side of the fracture zone, may be highlighted and/or color coded to assist the user during the selection process. Further, the system may utilize an automatic selection feature whereby such events are selected for further analysis automatically.

In one embodiment, data pertaining to a subset of the seismic events recorded by the system may be selected for further analysis, as illustrated by Box (48). This may be accomplished using preprogrammed thresholds relating to the magnitude or position of the events to be selected or by manual selection of desired seismic events by the user using an input device, such as a mouse or keyboard (not shown).

In one embodiment, the subset of data selected for further analysis may be drawn to data pertaining to seismic events having wave field(s) determined to pass through fractures induced by the hydraulic fracturing operations. In one embodiment, seismic events of interest may be seismic events located on the far side of the fracture treatment zone, i.e., farthest from the seismic sensor array and/or where the seismic wavefield(s) are more likely to pass through already fractured portions of the formation.

The direct wave fields for selected seismic events may then be analyzed in order to derive their spectral attributes, as illustrated by Box (50). Several digital signal processing methods may also be utilized to enhance the direct wave field for analysis. Haldorsen, J. B. U., Miller. D. E., and Walsh, J. J., 1994, Multichannel Wiener Deconvolution of Vertical Seismic Profiles, Geophysics, vol. 59, no. 10, p 1500-1511 and U.S. Pat. No. 4,922,362, both incorporated by reference herein, describe example digital signal processing methods.

After the spectral attributes of selected seismic wave field data from the fracture operation have been derived, the database (14) containing predicted spectral estimates (described above) may be searched for predicted spectral data conforming, at least in part, to the characteristics of the hydraulic fracturing operation, as illustrated by Box (52). The search may be initiated automatically after deriving some or all of the spectral estimates for the seismic events of interest or manually at the direction of the user.

In one embodiment, the user may enter searchable formation characteristics such as the number of subterranean fractures, the thickness of the subterranean fractures, subterranean fracture orientation, hydraulic fracturing fluid characteristics such as fracturing fluid content/composition/volume, proppant characteristics, average fracture thickness, etc. The database may then retrieve predicted spectral estimates that match one or more of the searched formation characteristics, in one embodiment, the determined spectral estimates may be compared to the retrieved predicted spectral estimates, as illustrated by Box (54).

In one embodiment, the compared spectral estimates may include determined power spectrum values and predicted power spectrum values. Further, compared spectral estimates may include determined attenuation values and predicted attenuation values. The comparison may be utilized to generate a predicted hydrocarbon content for the fracture zone (28) of the formation (26) subjected to hydraulic, fracturing, as illustrated by Box (56). In one embodiment, the predicted attenuation of the power spectrum may be compared to the determined attenuation of the power spectrum and matched to a hydrocarbon content value associated with the predicted power spectrum.

This feature provides the system and/or the user (44) with a reliable estimate of the hydrocarbon content released by the hydraulic fracturing operation given the available formation parameters. Results of the comparison may be displayed upon the graphic user interface (46) in real time or according to a predetermined schedule. Information concerning the estimated hydrocarbon content released by the fracturing operation may be utilized to adjust or alter the fracturing operation, as illustrated by Box (58).

Adjustments and/or alterations of the fracturing operation may be accomplished according to a preprogrammed adjustment process or manually by the user. For example, hydraulic fracture parameters such as pumping pressure, stimulation fluid, and proppant concentrations may be varied in order to optimize stimulation of the formation.

Further, the fracturing operation may be shut down, expanded, limited in duration or scope and/or moved to another section of the formation, depending on the estimated hydrocarbon content. In one embodiment, threshold values of estimated hydrocarbon content may be utilized by the system to initiate alterations to the hydraulic fracturing operation and/or provide specific suggestions to the user. For example, an estimated hydrocarbon content greater than 10000 units could result in an expansion recommendation, while a value of less than 2000 units could result in a shut own recommendation.

In one embodiment, threshold values may utilize various ratios and/or mixtures of hydrocarbon content values, e.g., gas, petroleum, and/or condensate, as desired. For example, instead of a total hydrocarbon content threshold, the system may utilize a 1/2/1 ratio of gas/petroleum/condensate to trigger one or more recommendations and/or actions. This feature allows the system to be tailored to specific hydrocarbon goals, thus improving efficiency.

Computers, such as the computer data acquisition and control system (12) described herein, may run programs containing instructions, that, when executed, perform methods according to the principles described herein. Furthermore, the methods described herein may be fully automated and able to operate continuously, as desired.

Figure 6:
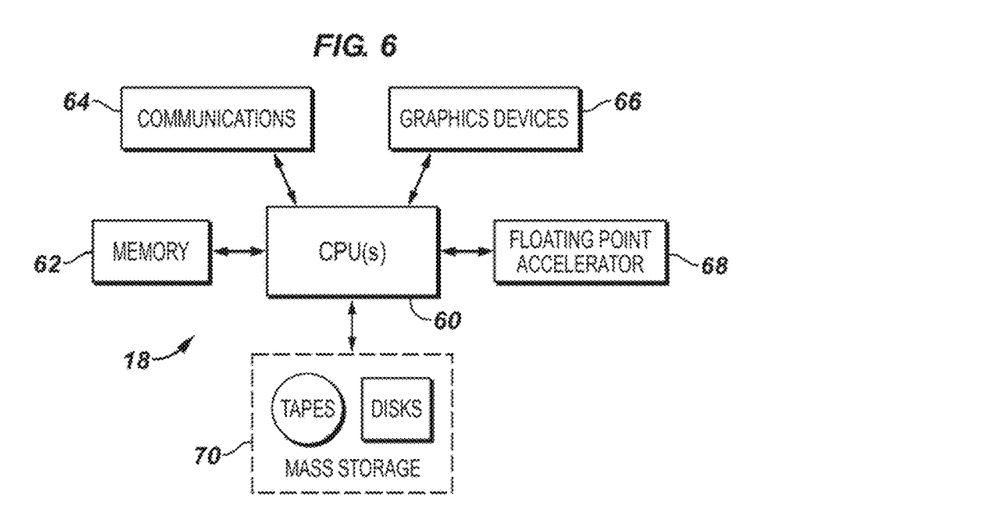
FIG. 6 is a schematic illustration of a computer control system of one embodiment.

Referring to FIG. 6, an example computer data acquisition and control system (18) is illustrated. In this example, computer data acquisition and control system, referred to also as control system, may be implemented on a digital computer capable of processing large amounts of data. FIG. 6 illustrates one possible configuration for control system (18). The data processor may utilize one or more central processing units (60), memory (62), communications or I/O modules (64), graphics devices (66), a floating point accelerator (68), and mass storage devices such as tapes and discs (70).

Storage device (70) may include a floppy drive, hard drive, CD-ROM, optical drive, or any other form of storage device. In addition, the storage devices may be capable of receiving a floppy disk. CD-ROM, DVD-ROM, disk, flash drive or any other form of computer-readable medium that may contain computer-executable instructions. Further communication device (64) may be a modem, network card, or any other device to enable communication to receive and/or transmit data. It should be understood that any control system (18) may include a plurality of interconnected (whether by intranet or Internet) computer systems, including without limitation, personal computers, mainframes, PDAs, cell phones and the like.

It should be understood that the various technologies described herein may be implemented in connection with hardware, software or a combination of both. Thus, various technologies, or certain aspects or portions thereof, may take the form of program code (i.e. instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies.

In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Control system (18) and processor (60) may include hardware capable of executing machine readable instructions, as well as the software for executing acts that produce a desired result. In addition, control system (18) may include hybrids of hardware and software, as well as computer sub-systems.

Hardware may include at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine of server.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform.

Further, the computer system may operate in a networked environment using logical connections to one or more remote computers. The logical connections may be any connection that is commonplace in offices, enterprise-wide computer networks, intranets, and the Internet, such as local area network (LAN) and a wide area network (WAN). The remote computers may each include one or more application programs.

When using a LAN networking environment, the computer system may be connected to the local network through a network interface or adapter. When used in a WAN networking environment, the computer system may include a modem, wireless router or other means for establishing communication over a wide area network, such as the Internet. The modem, which may be internal or external, may be connected to the system bus via the serial port interface. In a networked environment, program modules depicted relative to the computer system, or portions thereof, may be stored in a remote memory storage device.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

What is claimed is:

1. A method comprising:
receiving, by a computer processor, seismic data from a seismic sensor, wherein the seismic sensor is positioned proximate to a wellbore traversing a subterranean formation;
selecting, by the computer processor, a subset of the seismic data comprising data of interest pertaining to one or more seismic events having wave fields that passed though fractures induced by a hydraulic fracture operation;

determining, by the computer processor, a spectral estimate of the data of interest;

comparing, by the computer processor, the spectral estimate of the data of interest to a predicted spectral estimate stored upon a computer database coupled to the processor;

generating, by the computer processor, an estimated hydrocarbon content for at least a portion of the subterranean formation using the comparison; and displaying, by the computer processor, the estimated hydrocarbon content on a graphic user interface.

2. The computer implemented method of claim 1, further comprising determining the predicted spectral estimate by modeling characteristics of the subterranean formation using one or more formation parameters of the subterranean formation.

3. The computer implemented method of claim 2, further comprising selecting the formation parameters from a group consisting of fracture thickness, number of fractures, fluid characteristics, and hydrocarbon content.

4. The computer implemented method of claim 1, further comprising:

prior to the receiving the seismic data, performing the hydraulic fracture operation; and after generating the estimate, altering a next hydraulic fracture operation based at least in part upon the estimated hydrocarbon content.

5. The method of claim 1, wherein:

the predicted spectral estimate comprises predetermined information stored in a database; and the comparing comprises:

receiving characteristics of the subterranean formation from a user via a user input device; and searching the database by determining matches between the characteristics of the subterranean formation and the predetermined information.

6. The method of claim 5, wherein:

the characteristics of the subterranean formation comprise power spectrum values determined from the seismic data; and the predetermined information comprises power spectrum values predicted for the subterranean formation by computer modeling.

7. A system comprising:

a seismic sensor positioned within a subterranean formation;

a hydraulic fracturing apparatus operationally connected with the subterranean formation to produce fractures in the subterranean formation;

a computer system comprising a processor, a storage device, and program instructions stored on the storage device;

a database containing predicted spectral estimates operationally connected to the computer system, wherein the program instructions, when executed by the processor, control the computer system to perform operations comprising:

receiving seismic data from the seismic sensor, the seismic data being generated by seismic events caused by the hydraulic fracturing apparatus;

selecting a subset of the seismic data comprising data of interest pertaining to one or more of the seismic events having wave fields that passed though fractures induced by the hydraulic fracturing apparatus;

determining a spectral estimate of the data of interest;

comparing the determined spectral estimate of the data of interest to a predicted spectral estimate stored upon the database; and generating an estimated hydrocarbon content for at least a portion of the subterranean formation using the comparison.

8. The system of claim 7, wherein:

the hydraulic fracturing apparatus generates a fracture zone in the subterranean formation; and the selecting the subset of seismic data comprises determining that the one or more seismic events were generated in a side of the fracture zone remote from a position of the seismic sensor.

9. The system of claim 7, wherein the subterranean formation comprises consolidated rock.

10. The system of claim 7, wherein the seismic sensor is positioned at least 700 feet beneath the earth's surface.

11. The system of claim 7, wherein the seismic sensor is positioned proximate to a wellbore traversing the subterranean formation.

12. The system of claim 7, wherein the determined spectral estimate and the predicted spectral estimate each comprise a power spectrum representing a power determined for the subterranean seismic events over a range of frequencies.

13. The system of claim 12, wherein the determined spectral estimate and the predicted spectral estimate are each associated with an attenuation value.

14. The system of claim 13, wherein the attenuation value further comprises a frequency value greater than or equal to 100 Hertz.

15. A computer readable medium comprising instructions which, when executed, cause a computer to perform operations comprising:

receiving seismic data from a seismic sensor, wherein the seismic sensor is positioned proximate to a wellbore traversing a subterranean formation;

selecting a subset of the seismic data comprising data of interest pertaining to one or more seismic events having wave fields that passed though fractures induced by a hydraulic fracturing operation;

determining a spectral estimate of the data of interest;

comparing the spectral estimate of the data of interest to a predicted spectral estimate;

generating an estimated hydrocarbon content for at least a portion of the subterranean formation using the comparison; and displaying the estimated hydrocarbon content on a graphic user interface.

16. The computer readable medium of claim 15, wherein the operations further comprise generating the predicted spectral estimate by modeling characteristics of the subterranean formation using one or more formation parameters of the subterranean formation, the formation parameters comprising fracture thickness, number of fractures, fluid characteristics, or hydrocarbon content.

17. The computer readable medium of claim 15, wherein the determined spectral estimate and the predicted spectral estimate each comprise a power spectrum representing a power determined for the subterranean seismic events over a range of frequencies.

18. The computer readable medium of claim 17, wherein the determined spectral estimate and the predicted spectral estimate are each associated with an attenuation value.

19. The computer readable medium of claim 18, wherein the attenuation value further comprises a frequency value greater than or equal to 100 Hertz.

20. The computer readable medium of claim 15, wherein the operations further comprise determining that the one or more seismic events were generated in a side of a fracture zone remote from the seismic sensor produced by a hydraulic fracture apparatus.

* * * * *